United States Patent [19]
Shusterman

[11] Patent Number: 5,810,379
[45] Date of Patent: Sep. 22, 1998

[54] FREEWHEELING DRIVETRAIN FOR TANDEM BICYCLES

[76] Inventor: G. Todd Shusterman, 5405 E. Bails Dr., Denver, Colo. 80222-3961

[21] Appl. No.: 276,204

[22] Filed: Jul. 18, 1994

[51] Int. Cl.⁶ ..................................................... B62M 1/02
[52] U.S. Cl. ........................................... 280/231; 280/260
[58] Field of Search ................................... 280/231, 230, 280/239, 259, 260, 261, 238, 236

[56] References Cited

U.S. PATENT DOCUMENTS

| | | |
|---|---|---|
| 357,110 | 2/1887 | Weston et al. . |
| 448,358 | 3/1891 | Moore . |
| 528,954 | 11/1894 | Lippy et al. ............................. 280/238 |
| 605,365 | 6/1898 | Weaver . |
| 789,580 | 5/1905 | Trainor ................................... 280/261 |
| 1,687,218 | 10/1928 | Kutarna . |
| 2,331,976 | 10/1943 | Hare . |
| 2,385,892 | 10/1945 | Swanson . |
| 3,680,879 | 8/1972 | Cogliano . |
| 3,870,338 | 3/1975 | Holub . |
| 3,963,262 | 6/1976 | Estell . |
| 4,029,326 | 6/1977 | Blow . |
| 4,070,032 | 1/1978 | Cunningham . |
| 4,108,460 | 8/1978 | Silva ...................................... 280/236 |
| 4,303,256 | 12/1981 | Mortensen . |
| 4,410,198 | 10/1983 | Fernandez et al. . |
| 4,502,705 | 3/1985 | Weaver . |
| 4,666,172 | 5/1987 | Hartmann . |
| 4,792,149 | 12/1988 | Harmon . |
| 4,826,190 | 5/1989 | Hartmann ............................... 280/260 |
| 4,953,882 | 9/1990 | Craig ...................................... 280/258 |
| 5,209,507 | 5/1993 | Domenge ............................... 280/231 |
| 5,577,749 | 11/1996 | Ross ........................................ 280/261 |
| 5,611,556 | 3/1997 | Davidow ................................. 280/238 |

FOREIGN PATENT DOCUMENTS

| | | |
|---|---|---|
| 914900 | 10/1946 | France . |
| 54895 | 1/1891 | Germany . |
| 3641311 A | 2/1988 | Germany . |
| 3914902 | 11/1990 | Germany .............................. 280/238 |
| 317740 | 5/1934 | Italy ....................................... 280/236 |
| 679767 | 1/1965 | Italy ....................................... 280/236 |
| 0029600 | of 1897 | United Kingdom .................. 280/231 |
| 0478875 | 1/1938 | United Kingdom .................. 280/231 |
| 2095631 | 10/1982 | United Kingdom . |
| 2267469 | 12/1993 | United Kingdom .................. 280/231 |

OTHER PUBLICATIONS

The Twin–drive, Dual–freewheel Tandem, Robert A. Cook, Bike Tech, pp. 13–14, Jun., 1988.

"Faster You Fool" Bicycling Magazine, Jan. 1986, pp. 18–22.

*Primary Examiner*—Anne Marie Boehler
*Attorney, Agent, or Firm*—Kenton L. Freudenberg; Maxwell C. Freudenberg

[57] ABSTRACT

A drive train for a tandem bicycle, in which the riders are positioned one behind the other, comprising a transverse intermediate shaft mounted on the bottom tube of a tandem bicycle between the two standard bottom brackets for the respective riders. Chains driven by the respective riders drive separate sprockets, each having an independent freewheel driving connections to the intermediate shaft and being smaller than the respective chainring which drives it. The intermediate shaft has one or more relatively small chain rings to drive the rear sprockets of the bicycle. The driven rings of the intermediate shaft are smaller than the respective crossover chainrings so that the intermediate shaft is driven at a higher speed than the respective pedal cadences. So that a given gear ratio variation between largest and smallest drive rings may be achieved with a smaller arithmetic gap between the number of teeth on the drive rings. Ground clearance may be greater that of a conventional tandem bicycle due to use of smaller driven and driving chainrings and elevated positioning of the intermediate shaft. The independent freewheeling of the cranksets allow each rider to independently control the rotational position of his or her crankarms for purposes such as clearing obstacles. The present invention also allows the riders to selectively change the relative rotational orientations of the cranksets to allow, for example, pedalling in full synchronization or 90° out of phase to achieve a smoother application of pedalling force.

15 Claims, 10 Drawing Sheets

FREEWHEELING DRIVETRAIN FOR TANDEM BICYCLES

BACKGROUND OF THE INVENTION

In order to propel a bicycle a rider applies rotational movement to the "crankset" which is comprised of right and left crankarms, each of which is a lever having a pedal at an outer end and which is attached at an inner end to one end of a common axle or spindle which is supported by and rotates upon bearings. The bearing and axle assembly and its corresponding housing in the bicycle frame are referred to as a "bottom bracket." The crankarms are oriented 180 degrees from one another about the axis of the bottom bracket to allow alternating application of force by right and left legs. The final drive to the bicycle wheel comprises a driving chainwheel or "chain ring" on the crankset which transmits rotational movement to a driven chainwheel or "sprocket" through an endless flexible chain which passes around and is engaged by the respective chainwheels.

A typical tandem bicycle is provided with a crankset for each of two riders to allow each rider to provide a portion of the propulsive force of the bicycle. Most commonly, two individual toothed sprockets or "chainrings," one on each of the two cranksets, are coupled together with what is known as a "crossover" chain so that the respective cranksets will rotate in unison, even if either rider is not applying any pedalling force.

In pedalling together the riders will ideally remain synchronized and pedal smoothly together. However, in practice, a number of situations may arise wherein having the cranksets coupled together may create undesirable results. A lapse of attention, eating or drinking while riding, or simply changing position may cause a hesitation in pedalling by one rider which can disturb the pedalling of the other rider and may, accordingly, adversely affect the balance of the bicycle and riders. It is therefore desirable to allow either rider to stop pedalling independently of the other rider.

When any bicycle is ridden off road it is necessary to have sufficient clearance so that portions of the bicycle which lie between the wheels will clear any obstacles or terrain irregularities to be ridden over. Typically the least ground clearance of any portion of the bicycle part occurs between the pedal end of a crankarm when the crankarm is vertical and extending downwardly from the bottom bracket. The pedals of the bicycle also extend to the side from the crankarm ends and are particularly prone to interference with obstacles. On a single bicycle the rider may selectively raise one pedal to its highest point to clear an obstacle which is slightly to one side of the bicycle or may rotate the crankarms to a horizontal orientation and parallel to the ground so to maximize clearance directly beneath the bottom bracket of the bicycle. In contrast, on a tandem where the riders may be passing over different obstacles at the same time, the crankarm positioning actions of one rider to prevent the pedals or crankarms from hitting an obstacle may be completely contrary to the actions required by the other rider. Accordingly it is desirable to that each rider be able to independently choose the orientation of his or her respective crankarms.

A traditional tandem bicycle with two bottom brackets located between the wheels is obviously longer and heavier than a single bicycle and the combined weight of bicycle and riders is very close to that of two individual bicycles and riders. However, the drivetrain components of a tandem, which are subject to much greater loads, are typically the same as those used on single bikes. Most often the crankarms on a tandem are coupled to be synchronized so that, for example, both riders will be executing a downward pedal stroke on the right side at the same time. Synchronization of the crankarms results in essentially two power strokes per revolution of the pedals, as is the case with a single bicycle. It is during such a downward stroke that maximum force or stress is placed upon the final drive chain which transmits power to the rear wheel thereby creating essentially twice the stress on drive components which might be created by a single rider.

A desirable alternate configuration fixes the crankarms 90 degrees out-of-phase so that there are essentially four power strokes per pedal revolution, thus providing a steadier or more uniform pedaling force and smoothing out the application of power and spreading the application of force more evenly throughout the rotation of the primary chainrings. This may also result in decreasing the maximum force applied to the drive train at any one point in the rotational movement of the chainrings. This alternate configuration has a disadvantage in that it may create more difficulty for the riders in mounting the bicycle and beginning to pedal. This is primarily because of the fact that at any given time no more than one pedal can be positioned at the bottom of a stroke, which is the only pedal position in which a pedal may bear the entire static weight of a rider without causing the pedals to rotate and without requiring a counteracting force on an opposing pedal/crankarm.

By allowing independent freewheeling of the respective crankarms, the riders may change the relative orientation of the respective crankarms at any time as may be desired to achieve the benefits of, for example, synchronized cranksets for mounting the bicycle and offset crankarms arms for normal pedalling.

On a standard tandem bicycle two riders are positioned one behind the other with the forward rider providing the control of the bicycle in the form of steering, shifting gears and the primary braking of the bicycle. The rear rider typically provides only pedalling power. Accordingly the common terms used to refer to the front and rear riders respectively are "captain" and "stoker."

Many bicycle components have become relatively standardized. Prime examples of such standardized components include the chains and sprockets which are used in the drivetrain of bicycles which use front (driving) and rear (driven) clusters of sprockets with associated front and rear derailleurs for a wide range of gearing. The ability of a rear derailleur to take up slack or "wrap" chain is often referred to as the "capacity" of the derailleur and is generally indicated by a number of teeth. Thus if a the gearing on a bicycle is achieved using a chainrings of 54 and 40 teeth and sprockets ranging from 12 to 28 teeth, a derailleur would need to have a capacity of at least 30 teeth (54+28)−(40+12) to allow use of all available chainring/sprocket combinations. However, as described below, this required 30 tooth chain wrap can be substantially reduced.

It is well recognized that mountain bikes, bicycles used for touring with heavy loads and tandem bicycles may benefit from having a wide range of available gearing but in view of the relatively standardized sizes of available chainrings and sprockets the available range of gearing may be severely limited by the capacity of the rear derailleur.

It is also recognized that even with modern shifting systems, the shifting of a chain from one chainring or sprocket to another is made more efficient when the respective adjacent chainrings or sprockets are not of widely varying sizes.

SUMMARY OF THE INVENTION

Current bicycles are typically of two types—those intended for use on paved surfaces and known as "road bikes" and those which may also be used on trails or unpaved surfaces and which are commonly called "mountain bikes." A tandem bicycle intended to be powered by two riders may be of either type. The present invention provides a drivetrain for tandem bicycles which allows freewheeling action of either of the two respective cranksets without affecting the application of pedalling power applied via the other crankset. The specific advantages obtained by the present invention are (1) increased ground clearance (2) independent freewheeling of either of two respective cranksets, (3) selectable rotational orientation of the respective cranksets, (4) decreased chain wrap for a given ratio of gears, and (5) a decrease in the difference in size between chainrings to achieving a given ratio of gears using standard gear components.

In accordance with the present invention a conventional type tandem bicycle having positions for a plurality of riders and having a steerable front wheel and a rear driven wheel with frame means for supporting said wheels is modified by providing an intermediate drive system between plural pedal systems for the riders and a rear wheel drive system which is similar to a conventional rear derailleur system.

The multiple pedal systems each have a pair of pedals to be operated in circular paths at each rider position and each such pedal system having has at least one output driving element or chainring driven by the respective pair of pedals.

The rear wheel drive system is coupled to the rear driven wheel and has at least one driven sprocket at one side (the right side) of the rear wheel at a corresponding side of the bicycle frame.

The intermediate drive system is located between two pedal systems and is provided with a rotatable shaft having at the right side of said frame means at least one chainring for driving one such sprocket of the rear wheel drive system and having at the opposite or left side of said frame means a coaxial sprocket for each such pedal system. The axes for the rear wheel, the pedal systems and the shaft of the intermediate drive system are all parallel and spaced from each other.

Coupling means in the form of a flexible bicycle chain extend at the right side of the frame means between a chainring of said intermediate drive system and a sprocket of said rear wheel drive system.

Coupling means in the form of a flexible bicycle chain are provided at the opposite or left side of the frame means for each pedal system between a chainring of the pedal system and a respective sprocket of said intermediate drive system.

Free-wheel means in said systems between each pair of pedals and the rear wheel enable each rider to start or stop application of a driving force to the rear wheel independently of the force application by any other rider. The free wheel means includes for each pedal system a one-way drive means between the intermediate drive system shaft and a respective sprocket thereon driven by the pedal system. The intermediate drive system shaft operates at a rotational speed higher than any pair of pedals to allow use of smaller chainrings and thereby achieves the benefits of reduced chain wrap. However the linear speed of the chain remains unchanged and does not increase stress on the chain to the rear drive system. In the example stated above, a system with chainrings of 54 and 40 teeth and sprockets of 12 to 28 teeth requires a chain wrap of 30 teeth. However if the rotational speed of the final drive chainrings can be doubled, then chainrings of 27 and 20 teeth will create exactly the same chain speed as the 54 and 40 tooth chainrings yet the total chain wrapping capacity need only be 23 teeth, (27+28)–(20+12), and the chainrings themselves are only 7 teeth different in size rather than 14.

The chain between the intermediate drive system and the rear wheel drive system engages a chainring of an intermediate drive system chainring cluster and is selectively shifted to any of the chainrings by means of a conventional type front derailleur mounted on the frame as described elsewhere. Similarly, a conventional rear derailleur is provided adjacent the rear wheel multiple sprocket cluster to selectively shift the chain thereat to any of the sprockets of the rear wheel cluster. Both derailleurs are selectively operated by cable drives manipulated by the captain in a conventional manner.

The mounting means for the intermediate drive system can be so located relative to the bicycle frame whereby the lowest portion of said intermediate drive system is substantially higher than the lowest portion of any chainring of either of said two pedal systems when the bicycle is on a horizontal surface, thus providing greater ground clearance near the longitudinal center of the bicycle, as is very desirable for off-road usage of tandem mountain bicycles.

The invention enables increased ground clearance for a single rider bike because it enables reduction of the diameter of the pedal-connected chainring when the intermediate drive system is at increased height between the pedal system and the rear wheel drive system. The benefits of reduced chain wrap and no increase in stress on the chain to the rear wheel even when using a smaller chainring at the intermediate drive system are also achieved with a single rider bike.

It is an object of the present invention to provide an improved drive system for a bicycle providing increased ground clearance without raising the pedal axis and without changing either the gear ratio between pedals and the rear wheel or the size of the sprockets at the rear wheel.

Another object of the present invention is to achieve independent freewheeling of either of two respective cranksets of a tandem bicycle without changing the general configuration of the individual cranksets or the mounting means therefor in their respective bottom bracket structures.

A further object of the invention is to achieve selectable rotational orientation of the respective cranksets on a tandem bicycle.

A still further object of the invention is to provide decreased chain wrap for a given ratio of gears.

Another object of the present invention is to enable retrofit of a standard bicycle to achieve one or more of the above objects by bolting or otherwise securely attaching to the bicycle frame structure an intermediate drive system spaced from the wheels and any bottom bracket structure.

DETAILED DESCRIPTION OF THE INVENTION

Figure 1:
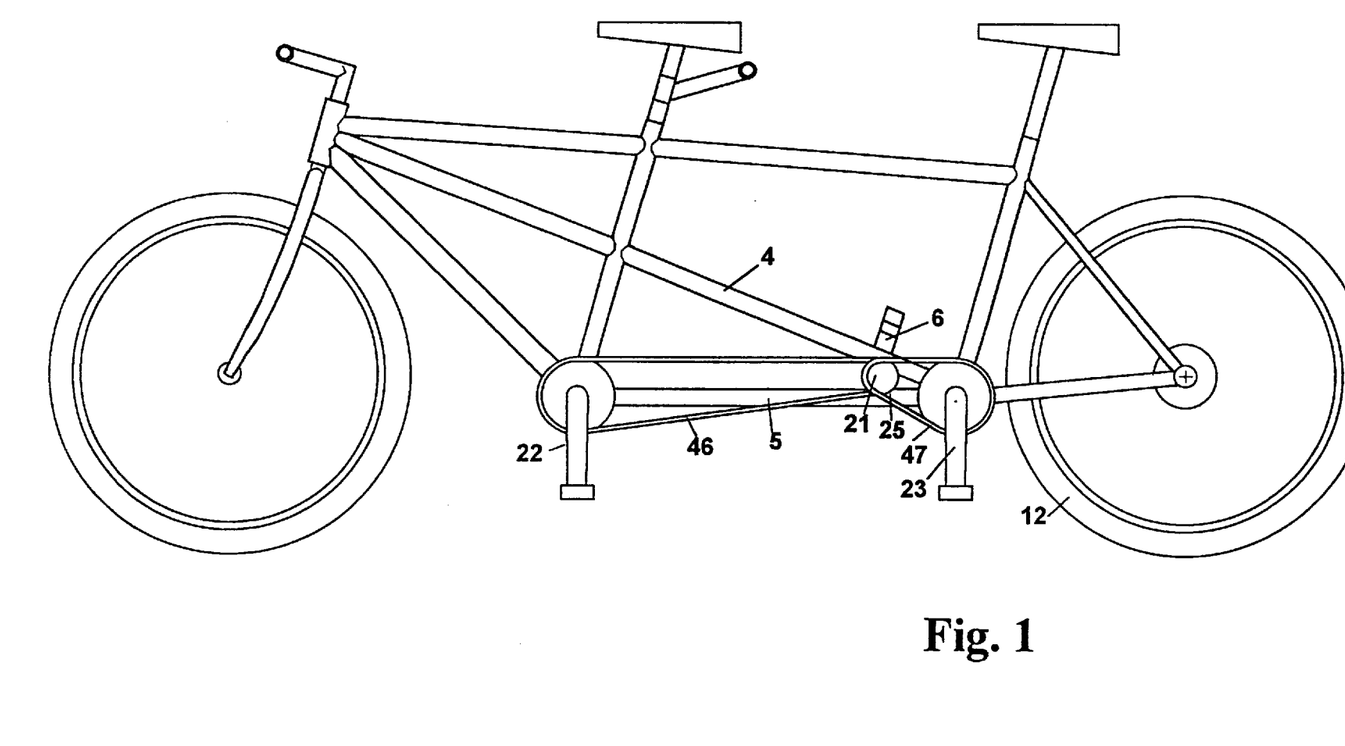
FIG. 1 is a side view of the left side of a tandem bicycle incorporating the intermediate shaft drive of the preferred embodiment of the present invention.
Figure 2:
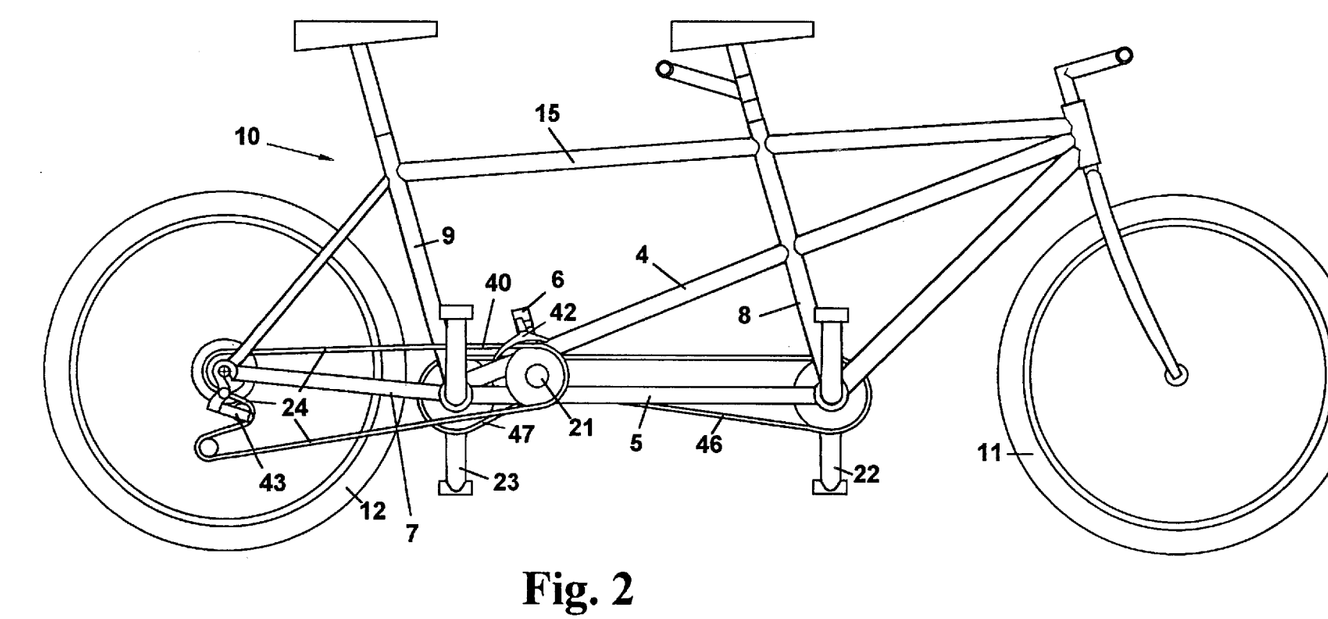
FIG. 2 is a side view similar to FIG. 1 of the right side of a tandem bicycle.

In the preferred embodiment of the present invention, shown generally in FIGS. 1–2, a conventional type tandem bicycle 10, having positions for a plurality of riders and having a steerable front wheel 11 and a rear driven wheel 12 with frame means 15 for supporting said wheels, is modified by providing an intermediate drive system 21 between plural pedal systems 22 and 23 for the riders and a rear wheel drive system 24 which is similar to a conventional rear derailleur system.

The multiple pedal systems each have a pair of pedals to be operated in circular paths at each rider position and each such pedal system having has at least one output driving element or chainring driven by the respective pair of pedals.

Figure 4:
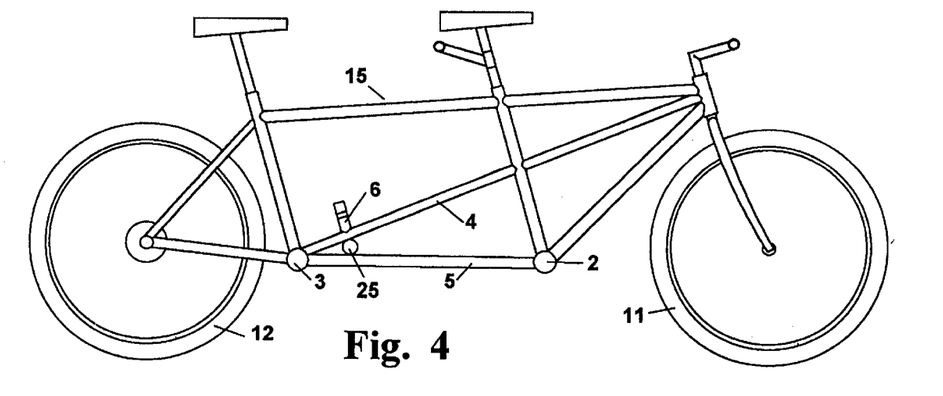
FIG. 4 shows an example of a tandem bicycle with a frame of "direct lateral" design using a partial mock seat tube to accommodate the present invention as in FIGS. 1 and 2.
Figure 5:
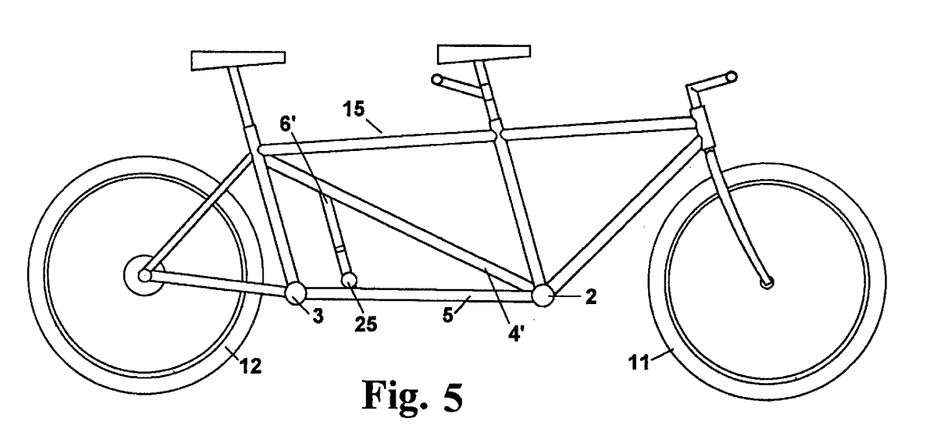
FIG. 5 shows an example of a tandem bicycle with a frame of "uptube" design using a partial mock seat tube to accommodate the present invention as in FIGS. 7–12.
Figure 6:
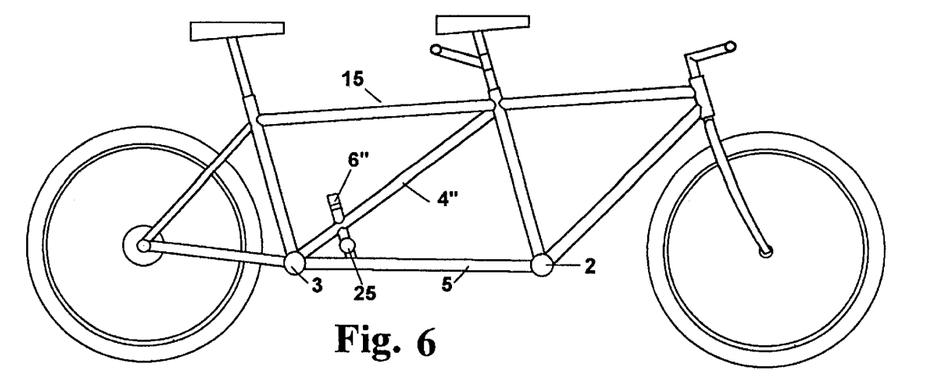
FIG. 6 shows an example of a tandem bicycle with a frame of "double diamond" design using a partial mock seat tube to accommodate the present invention.

The preferred embodiment of the present invention is shown most clearly in FIG. 1 where an intermediate shaft housing 25 of an intermediate drive system 21 is made an integral part of the bicycle frame, by being attached just above the generally horizontal bottom tube 5 of the tandem frame at a point slightly ahead of the rear bottom bracket 3. However, the present invention may be adapted to a kit which may be readily retrofitted to a standard tandem bicycle. "The axes of the rear wheel drive system 24, the pedal systems 22 and 23 and the shaft of the intermediate drive system 21 are all parallel and spaced from each other. The pedal system axes are in the bottom bracket structures for the pedal cranks at opposite ends of the bottom tube of the frame of the tandem bicycle 10. These pedal system axes are essentially in the same horizontal plane when the bicycle is upright on a horizontal surface. The axis of the intermediate drive system 21 is between the two pedal system axes and is located above this horizontal plane." Within the intermediate shaft housing 25 an assembly, shown in part in FIG. 3, comprising an intermediate shaft 28 is supported on low friction bearings 30 such as ball bearings. The combination of housing and shaft assembly is virtually identical to a standard bicycle bottom bracket. A reinforcing tube 4 which is a component of a tandem bicycle frame and, in the most common configurations as seen in FIGS. 4–6, extends front-to-back between (A) the head tube and the rear bottom bracket 3 or (B) the front bottom bracket 2 and the rear seat cluster or (C) the front seat cluster and the rear bottom bracket 3. These representative frame configurations have acquired the names "direct lateral," "uptube," and "double diamond," respectively. A "front" derailleur 42 which is used to shift the driving or final chain 40 between chainrings on a normal tandem bicycle is mounted to the rear seat tube 9 of a tandem bicycle. In order to provide additional bracing for the intermediate drive system housing 25 and to accommodate a standard seat tube mounted front derailleur, as seen in FIGS. 2 and 7–9, ( or 6' in FIGS. 7–12) extends between the intermediate shaft housing and the reinforcing tube 4 (or 4' in FIGS. 7–12) and is oriented generally parallel to the front and rear seat tubes 8 and 9.

The shaft 28 of the intermediate drive system 21 may be an axle virtually identical to a standard bottom bracket spindle having tapered ends of square cross section to which the respective end assemblies may be secured.

Figure 3:
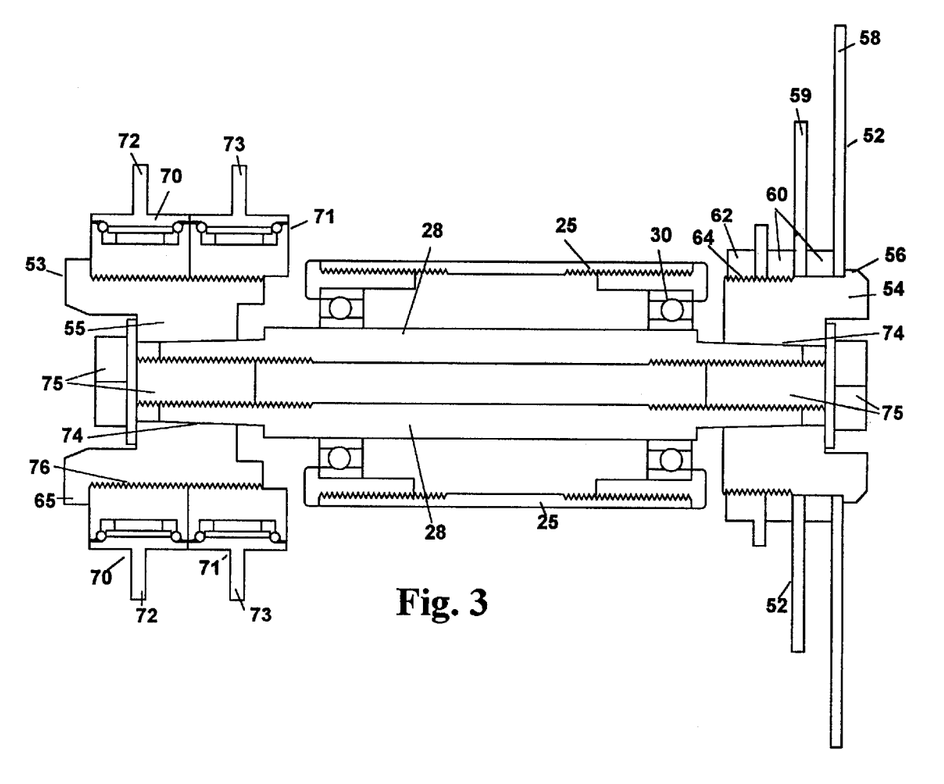
FIG. 3 is a cross sectional view of the intermediate shaft assembly of the preferred embodiment of the present invention.
Figure 7:
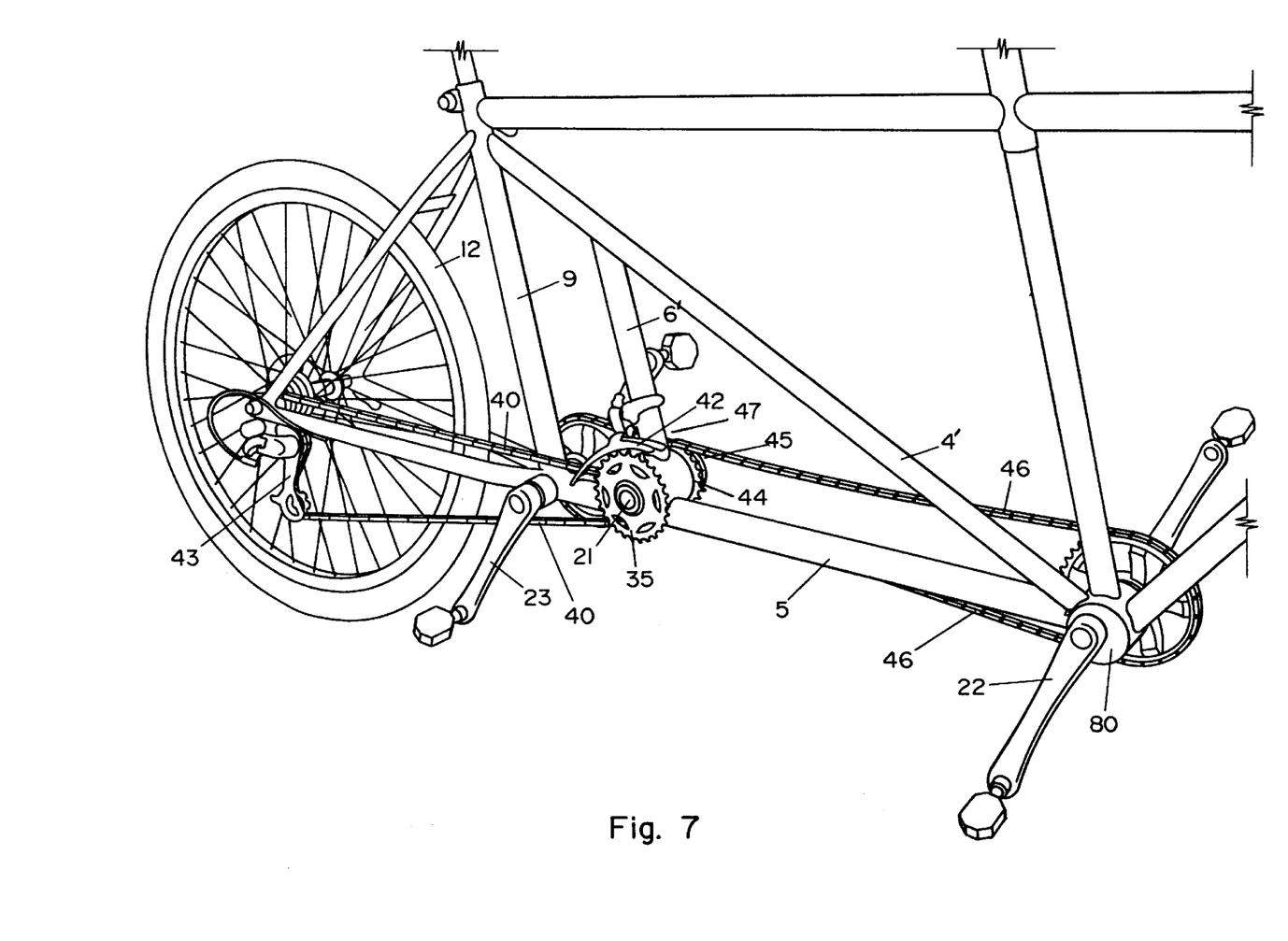
FIG. 7 is a perspective view from the right side of a tandem bicycle incorporating the intermediate shaft drive of the present invention.
Figure 8:
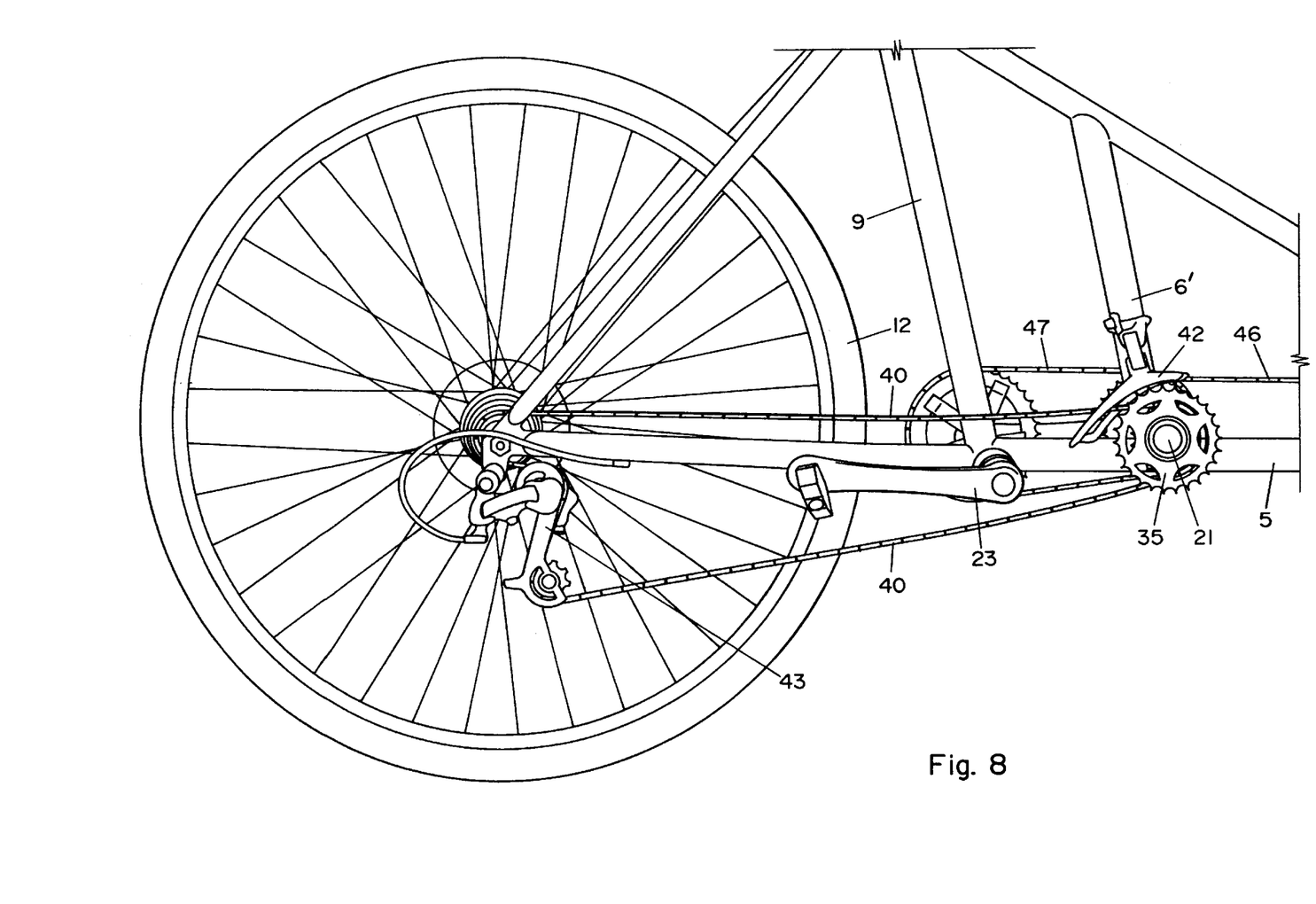
FIG. 8 is a perspective view from the right side of a tandem bicycle incorporating the intermediate shaft drive of the present invention and detail of the rear crankset.

As seen in FIG. 3, the right end of the shaft 28 of the intermediate drive system is provided at the right side of the bicycle frame means with a drive end assembly comprising a multiple chainring cluster 35, typically of three coaxial chainrings, mounted to a block 54. This drive end assembly forms the driving chainring elements for the rear wheel drive system to which they are coupled by a conventional flexible bicycle chain. However, as described in greater detail below these intermediate drive system chainrings may be, for example, half the diameter of the chainrings on a conventional bottom bracket drivetrain assembly. As seen in FIGS. 2 and 7–8, the rear wheel drive system 24, including a conventional type of rear wheel coaxial multiple sprocket cluster assembly 39 driven by the chain 40 and also including a free wheel mechanism for driving connection to the rear wheel, is also mounted on the same right side of the frame means and of the rear wheel.

The chain 40 is selectively shifted to any of the chainrings of the intermediate drive system chainring cluster by means of a conventional type front derailleur 42 mounted on a mock seat tube 6 on the frame as described elsewhere. Similarly, a conventional rear derailleur is provided adjacent the rear wheel multiple sprocket cluster to selectively shift the chain 40 to any of the sprockets of the rear wheel cluster. Both derailleurs are selectively operated by cables manipulated by the captain in a conventional manner.

Figure 9:
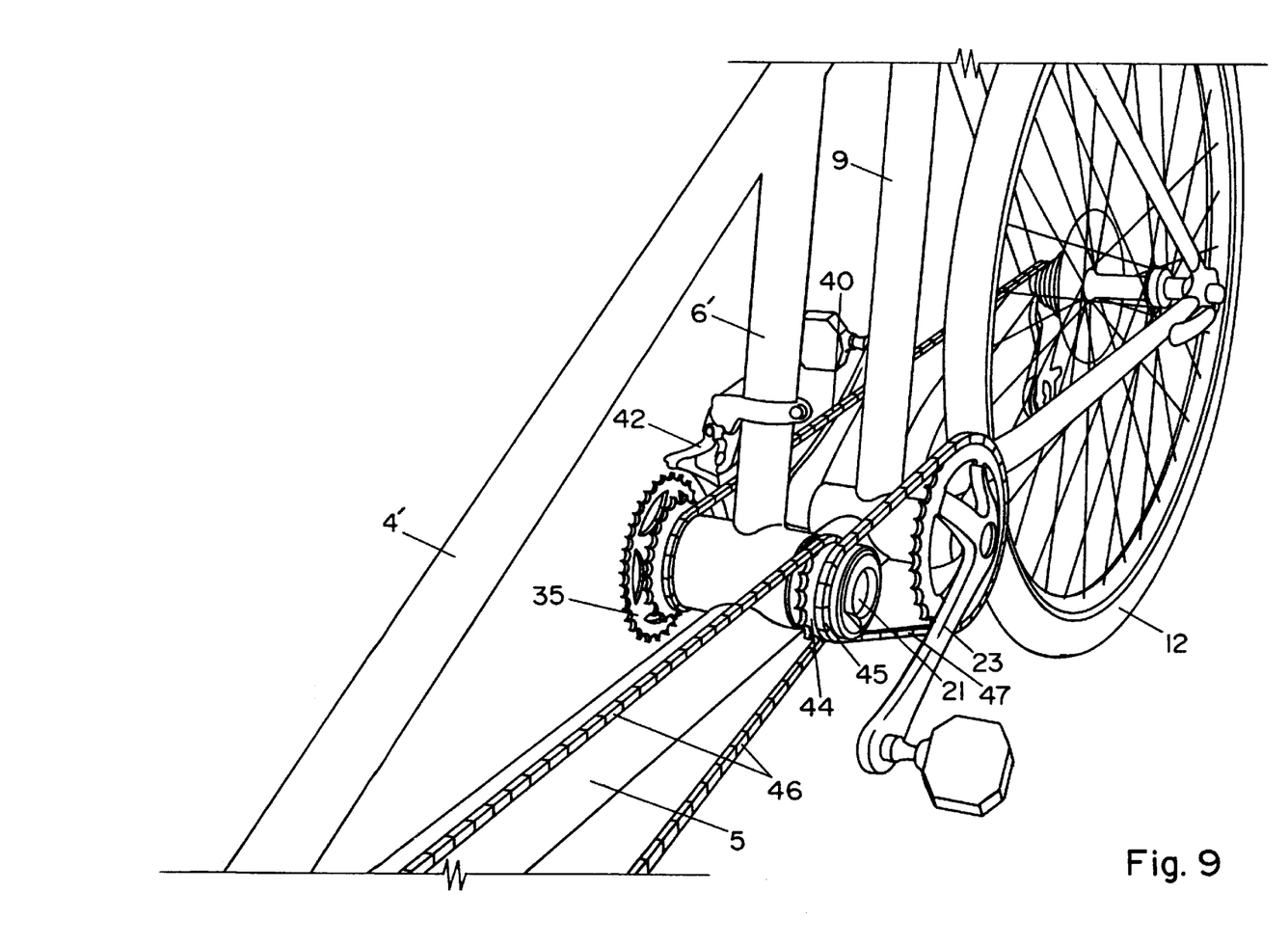
FIG. 9 is a perspective view from the left side of a tandem bicycle showing detail of the crossover freewheels on the intermediate shaft drive of the present invention.
Figure 10:
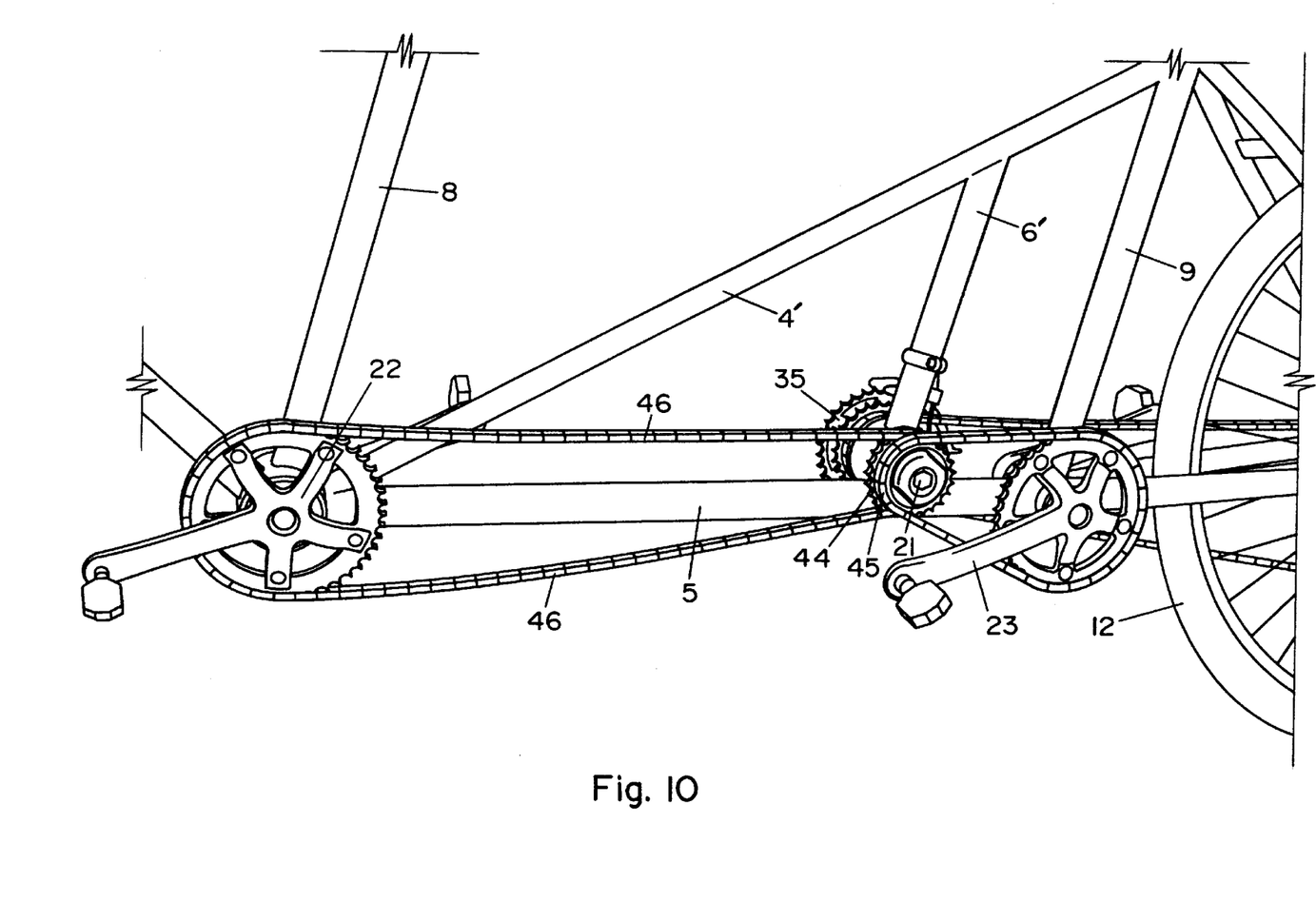
FIG. 10 is a perspective view from the left side of a tandem bicycle incorporating the intermediate shaft drive of the present invention and detail of the rear crankset.
Figure 11:
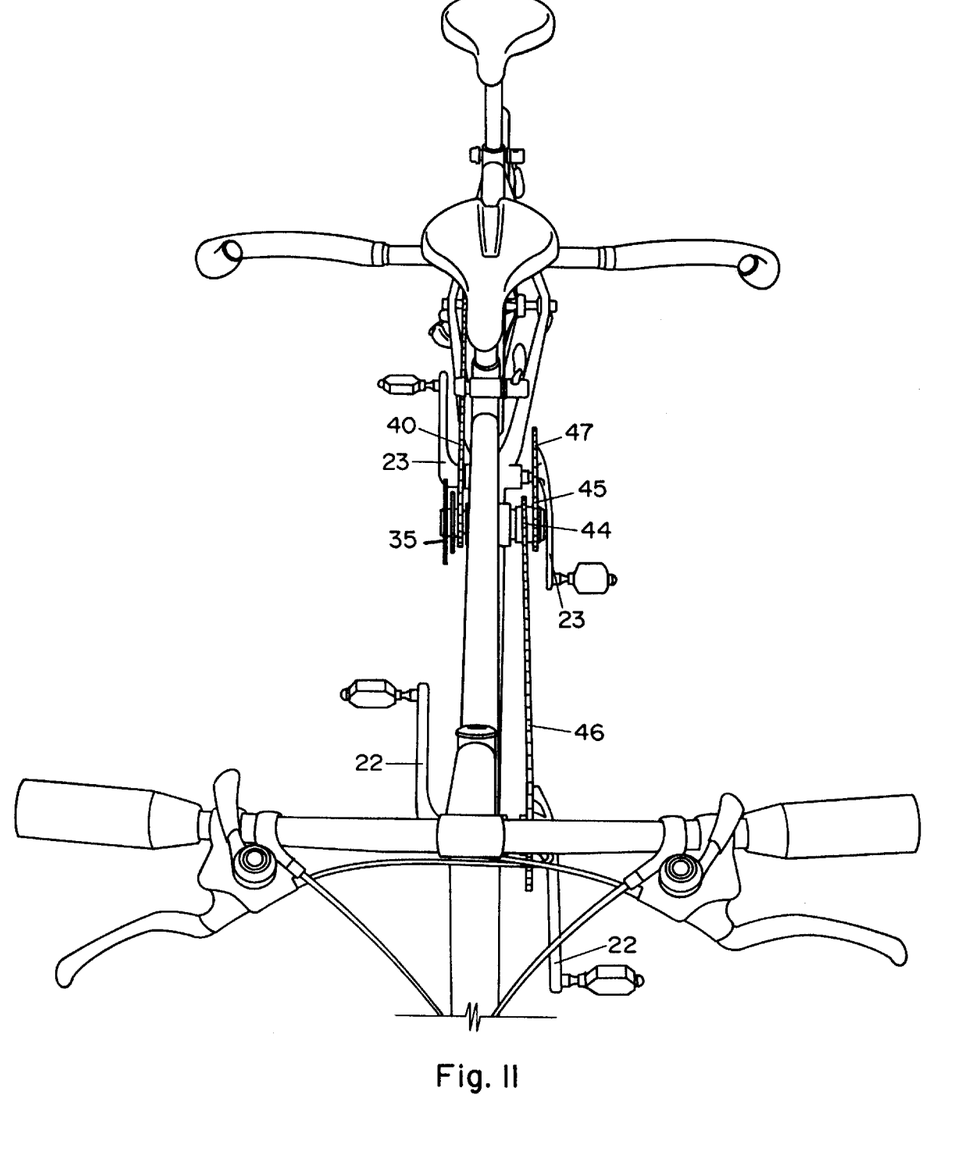
FIG. 11 is a perspective view from the front and above a tandem bicycle incorporating the intermediate shaft drive of the present invention showing detail of the layout of the front and rear crossover chains.
Figure 12:
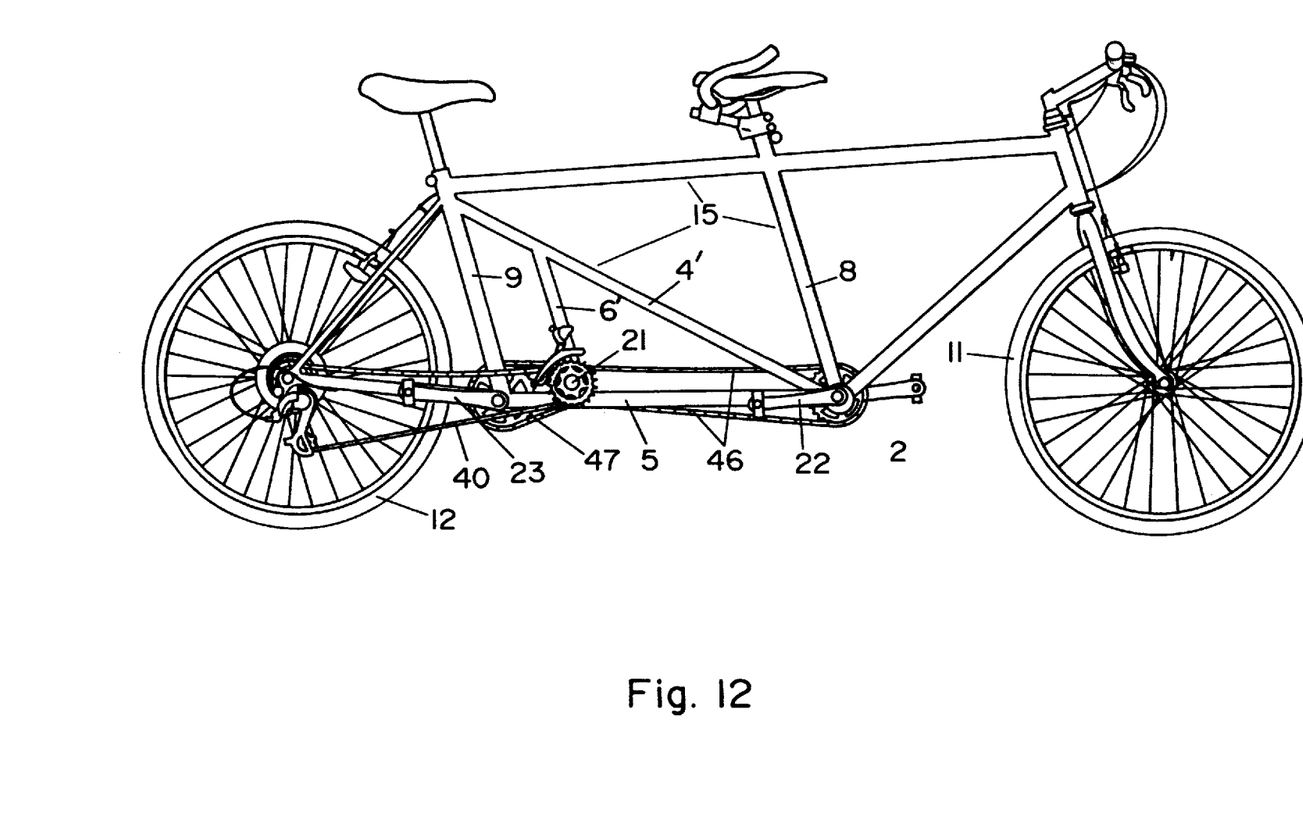
FIG. 12 is a perspective view of the left side of a tandem bicycle incorporating the intermediate shaft drive of the preferred embodiment of the present invention.

As seen in FIGS. 3 and 9–10, the left end of the shaft 28 of the intermediate drive system is provided with two independent coaxial sprockets 44 and 45 to drive the shaft 28 by means of respective front and rear crossover chains 46 and 47. Each of the sprockets 44 and 45 is provided with means coupling it to the shaft with a one-way drive 50 or freewheeling action. The first sprocket 44 is driven by the front rider via a front crossover chain 46 while the other sprocket 45 is driven by the rear rider via a rear crossover chain 47.

Each of the respective shaft end assemblies 52 and 53 seen in FIG. 3 is mounted upon its respective body 54 or 55. Each such body is merely a block of generally cylindrical configuration having outer surfaces which are threaded and/or splined to receive multiple chainrings or freewheel/sprockets respectively. The mounting of chainrings upon the driving block 54 of the right side of the bicycle is accomplished in precisely the manner which is commonly used for the mounting of sprockets upon a traditional multiple speed rear gear-cluster/freewheel and may use such rear sprockets as the chainrings. The drive block is provided with an annular lip 56 against which the chainrings are secured. Each of the two larger chainrings 58 and 59 has a circular central opening corresponding in size to the outer cylindrical surface of the drive block. Extending inwardly from the central opening are a number of splines which engage axially parallel grooves in the block surface to fix the respective chainring against rotation relative to the block. Cylindrical spacers 60 are used between the chainrings. The innermost chainring 62 is internally threaded to mate with external threads 64 upon the outer block surface and is threaded in place to secure all chainrings and spacers together.

The driven block 55 is also provided with an annular lip 65 and an externally threaded body of sufficient length to accommodate two standard single-speed freewheel assemblies 70 and 71. These separate assemblies, each bearing a single sprocket 72 and 73, are threaded side-by-side onto the body of the driven block 55 to butt against the raised lip. The right handed threading 76 is such that the freewheels assemblies will tend to tighten themselves in place as normal pedalling forces are applied. While the sprockets on the separate freewheels will most often be of the same size, they may be of different sizes to provide for a constant variation in the pedalling cadences of the respective riders.

After the respective sprockets or chainrings are assembled upon the blocks to form the end assemblies these assemblies are secured to the ends of the intermediate shaft. The driving block and the driven block are each provided with a central tapered hole 74 of square cross section to mate snugly and securely with the corresponding tapered ends of the intermediate shaft and each is anchored in place by a fixing bolt 75 threaded into the hollow internally threaded end of the shaft. This method of affixing the end assemblies to the intermediate shaft is virtually identical to the method used to anchor crankarms to the axle of a bottom bracket.

On a traditional tandem bicycle the crossover chainrings are of constant size and the crossover chain is of constant length. Accordingly, some means is employed for adjusting the tension of the crossover chain. Most commonly, the forward bottom bracket of a normal tandem is provided with an rotatably adjustable eccentric mounting, as seen at 80 in FIG. 7, to allow slight forward or backward movements of the bottom bracket axis so that the crossover chain may adjusted to an appropriate tension. In place of the traditional single crossover chain, the present invention uses two separate constant length chains. To enable independent adjustment of the tension of each chains, the intermediate shaft housing is provided with an eccentric bottom bracket mounting, similar to that at 80 in FIG. 7, which is used to adjust the rear crossover chain. Once the rear chain is adjusted and the intermediate shaft is fixed in place, the front chain tension may be adjusted using the eccentric of the front bottom bracket. Alternatively the position of the intermediate shaft may be fixed and both the front and rear bottom brackets may be provided with eccentrics for adjusting the tension of the respective crossover chains.

The one-way drive or freewheeling action at each of the intermediate shaft sprockets, in the interconnected pedal, intermediate drive and rear wheel drive systems, enables each of the riders to apply or stop applying a propulsive force to the rear wheel from a respective pedal system independently of such force application by each other rider.

The present invention is applicable to a single rider bicycle to achieve some of the advantages described herein. In this case, the intermediate drive system can be mounted above the normal bottom bracket on the front or rear of the seat tube with the input to the intermediate drive system shaft provided by a chain at the left side of the bicycle from a pedal system like that for the rear rider in FIGS. 1–2. It is of course necessary to assure that the drive chain driven by an output chainring on the right end of the intermediate drive system shaft, similar to the chain 40 in the present tandem embodiments, have a clear path to the area around the rear derailleur and free of interference by the wheel and the right chain and seat stays. Such a location of the intermediate drive system shaft would reorient the direction of the chain portions and the orientation of the derailleur to move them counterclockwise around the rear wheel axle relative to the positions shown in FIG. 2. If necessary the right chain and seat stays may be slightly reconfigured around the chain to allow both chain portions to pass inside the stays. As an alternative to providing additional clearance at the inside of the chain stay, an idler sprocket may be mounted along the right chain stay to guide the lower return portion of the chain past the outside of the stay and thence to the take up arm of the derailleur. The chain portions should be kept essentially coplanar as the chain moves around the output chainring of the intermediate drive system and around the derailleur as well as any idler.

Other variations within the scope of this invention will be apparent from the described embodiments and it is intended that the present descriptions be illustrative of the inventive features encompassed by the appended claims.

What is claimed is:

1. A tandem bicycle having positions for a plurality of riders and having a steerable front wheel and a rear driven wheel, frame means for supporting said wheels, multiple pedal systems each having a pair of pedals to be operated in circular paths by a bicycle rider and with each said pedal system having at least one output driving element driven by the respective pair of pedals, a rear wheel drive system coupled to the rear driven wheel, said rear wheel drive system having at least one driven input element at one side of the rear wheel at a corresponding side of the bicycle frame means, an intermediate drive system with a rotatable shaft having at said one side of said frame means at least one coaxial output element for driving one said driven element of the rear wheel drive system and having at the opposite side of said frame means a respective coaxial input element for each said pedal system, endless flexible coupling means extending at said one side of said frame means between an output element of said intermediate drive system and an input element of said rear wheel drive system, endless flexible coupling means at said opposite side of said frame means for each respective pedal system and extending between an output driving element of said pedal system and the respective input element of said intermediate drive system, free-wheel means in said systems between each pair of pedals and said rear wheel whereby each rider can drive said rear wheel forwardly independently of any other rider.

2. A bicycle according to claim 1 wherein said free wheel means includes for each pedal system a one-way drive means between said shaft and the respective coaxial input element driven by the pedal system.

3. A bicycle according to claim 1 wherein all of said systems have respective spaced parallel axes of rotation.

4. A bicycle according to claim 1 wherein said intermediate drive system is located between two pedal systems.

5. A bicycle according to claim 4 wherein one of said two pedal systems is between the front wheel and said intermediate drive system and the other of said two pedal systems is between the rear wheel and said intermediate drive system.

6. A bicycle according to claim 4 wherein the lowest portion of said intermediate drive system is higher than the lowest portion of any output driving element of either of said two pedal systems when the bicycle is on a horizontal surface.

7. A bicycle according to claim 1 wherein said shaft is driven at a rotational speed higher than any said pair of pedals.

8. A tandem bicycle having positions for a plurality of riders and having a steerable front wheel and a rear driven wheel, frame means for supporting said wheels, one pedal system, having a pair of pedals, for each rider position and with each said pedal system having at least one chainring driven by the respective pair of pedals, a rear wheel drive system coupled to the rear driven wheel, said rear wheel drive system having at least one driven sprocket at one side of the rear wheel at a corresponding side of the bicycle frame means, an intermediate drive system with a rotatable shaft having at said one side of said frame means at least one chainring for driving one said sprocket of the rear wheel drive system and having at the opposite side of said frame means a respective coaxial driven sprocket for each said pedal system, first chain means for driving said rear wheel drive system extending at said one side of said frame means between a chainring of said intermediate drive system and a sprocket of said rear wheel drive system, another chain means for each respective said pedal system for driving said intermediate drive system and extending at said opposite side of said frame means between a chainring of said pedal system and the respective driven sprocket of said intermediate drive system, free-wheel means in said systems between each pair of pedals and said rear wheel whereby each rider can drive said rear wheel forwardly independently of any other rider.

9. A bicycle according to claim 8 wherein said free-wheel means includes for each pedal system a one-way drive means between said shaft and the respective sprocket driven by the pedal system.

10. A bicycle according to claim 8 wherein all of said systems have respective spaced parallel axes of rotation.

11. A bicycle according to claim 8 wherein said intermediate drive system comprises multiple chainrings of different sizes at said one side of the frame means for driving one said sprocket of the rear wheel drive system and further includes derailleur means for selectively shifting said first chain means for driving said rear wheel drive system to each of said multiple chainrings.

12. A bicycle according to claim 11 wherein said shaft is driven at a rotational speed higher than any said pair of pedals and said rear wheel drive system includes at said one side of the rear wheel a coaxial cluster of different sized sprockets and derailleur means for selectively shifting the chain means between said intermediate drive system and said rear wheel drive system to each of the sprockets of said cluster.

13. A bicycle according to claim 8 wherein said intermediate drive system is located between two pedal systems.

14. A bicycle according to claims 13 wherein the lowest portion of said intermediate drive system is higher than the lowest portion of any chainring of either of said two pedal systems when the bicycle is on a horizontal surface.

15. A bicycle having a steerable front wheel and a rear driven wheel, frame means for supporting said wheels, said bicycle having multiple pedal systems for respective multiple riders, each pedal system having a pair of pedals to be operated in a circular path by a bicycle rider and with each said pedal system having at least one output driving chainring element driven by a respective pair of pedals, a rear wheel drive system coupled to the rear driven wheel, said rear wheel drive system having a coaxial cluster of different sized driven input sprocket elements at one side of the rear wheel at a corresponding one side of the frame means, an intermediate drive system with a rotatable shaft having, at said one side of said frame means, multiple coaxial output driving chainring elements for selectively driving one of said driven input sprocket elements of the rear wheel drive system and said shaft having at the opposite side of said frame means a coaxial input sprocket element for each said pedal system, all of said systems having respective spaced parallel axes of rotation, all elements of the intermediate drive system being higher than the lowest point on any said pedal system output chainring driving element, endless flexible coupling chain means extending at said one side of said frame means between a selected one of said multiple output chainring elements of said intermediate drive system and a selected input sprocket element of said rear wheel drive system, derailleur means for selectively shifting said chain means to a selected chainring element of said multiple output chainring elements on said shaft, derailleur means for selectively shifting said chain means to a selected input sprocket element of said cluster of the rear wheel drive system, endless flexible coupling chain means at said opposite side of said frame means for each said pedal system between the output driving chainring element of said pedal system and the respective input sprocket element of said intermediate drive system with said pedal systems driving said shaft at a rotational speed higher than any said pair of pedals, said systems having at least one free-wheel means between each respective pair of pedals and said rear wheel whereby said rear wheel can rotate forwardly during its operation independently of operation of each respective pair of pedals.

* * * * *